United States Patent
Hall et al.

[11] Patent Number: 5,867,894
[45] Date of Patent: Feb. 9, 1999

[54] DIFFERENTIAL PRESSURE ASSEMBLY DEVICE FOR MAKING CONNECTOR ASSEMBLIES

[75] Inventors: Richard R. Hall, Endwell, N.Y.; James R. Case, Brackney, Pa.

[73] Assignee: International Business Machines Corporation, Armonk, N.Y.

[21] Appl. No.: 791,967

[22] Filed: Jan. 31, 1997

[51] Int. Cl.[6] .................................................. B23P 21/00
[52] U.S. Cl. ................................ 29/785; 29/792; 29/759
[58] Field of Search ............................... 29/525.11, 759, 29/771, 783, 785, 791, 792, 809, 407.02, 407.03

[56] References Cited

U.S. PATENT DOCUMENTS

| | | |
|---|---|---|
| 3,675,301 | 7/1972 | McQuary et al. .................... 29/783 |
| 4,218,113 | 8/1980 | Uberbacher . |
| 4,237,605 | 12/1980 | Jung et al. ............................. 29/785 |
| 4,470,194 | 9/1984 | Cambiaghi et al. ................... 29/785 |
| 4,553,814 | 11/1985 | Bahl et al. . |
| 4,953,929 | 9/1990 | Basista et al. . |
| 5,291,645 | 3/1994 | Aoyama ............................. 29/407.02 |
| 5,400,500 | 3/1995 | Behnke et al. ....................... 29/785 |

*Primary Examiner*—David P. Bryant
*Attorney, Agent, or Firm*—Calfee, Halter & Griswold LLP

[57] ABSTRACT

The present invention provides a differential pressure apparatus that transports a component to a receptacle and activates a positive air flow that nutates component about the receptacle until properly aligned so that a negative air flow or gravity forces engagement of the aligned component into the receptacle. The present invention also provides a method of assembling a connector assembly using a differential pressure apparatus.

13 Claims, 3 Drawing Sheets

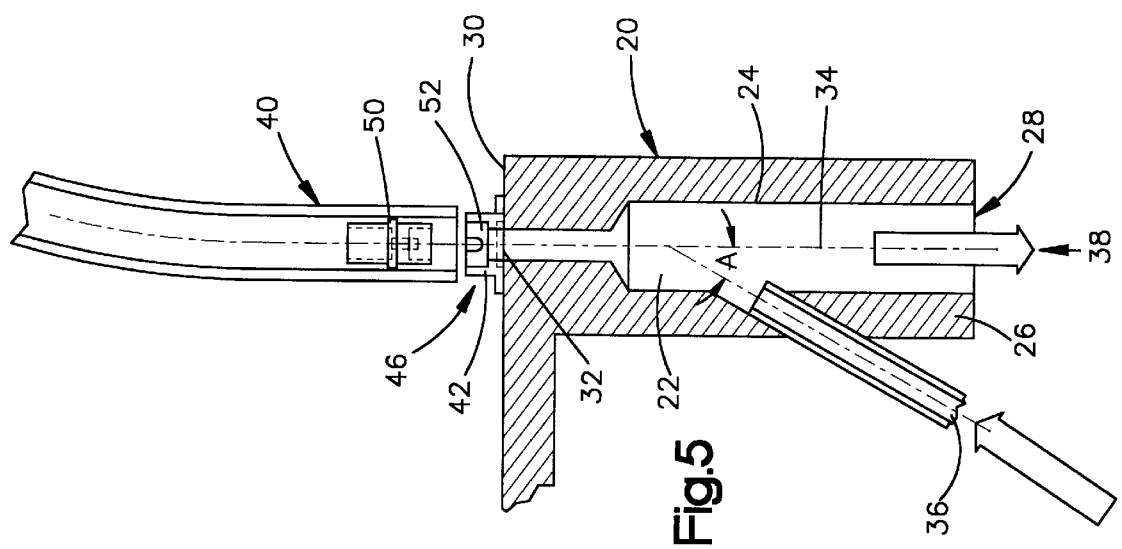
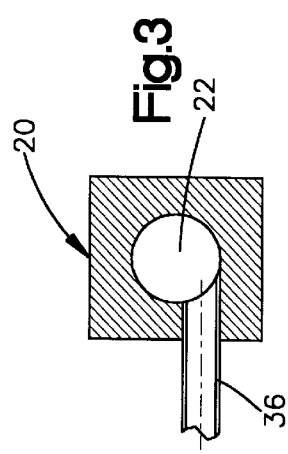
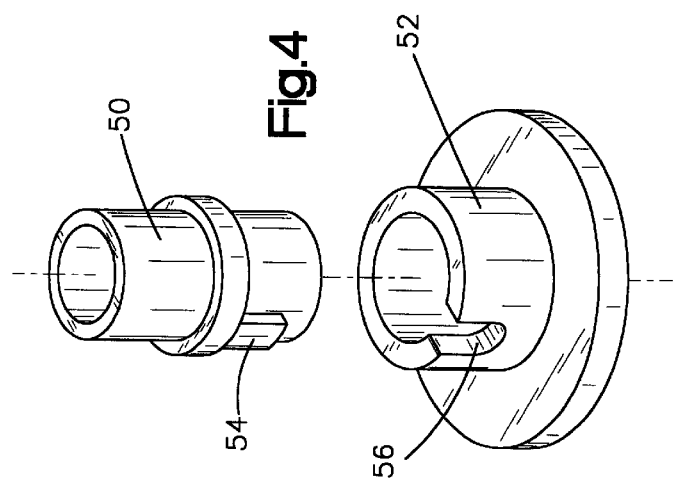

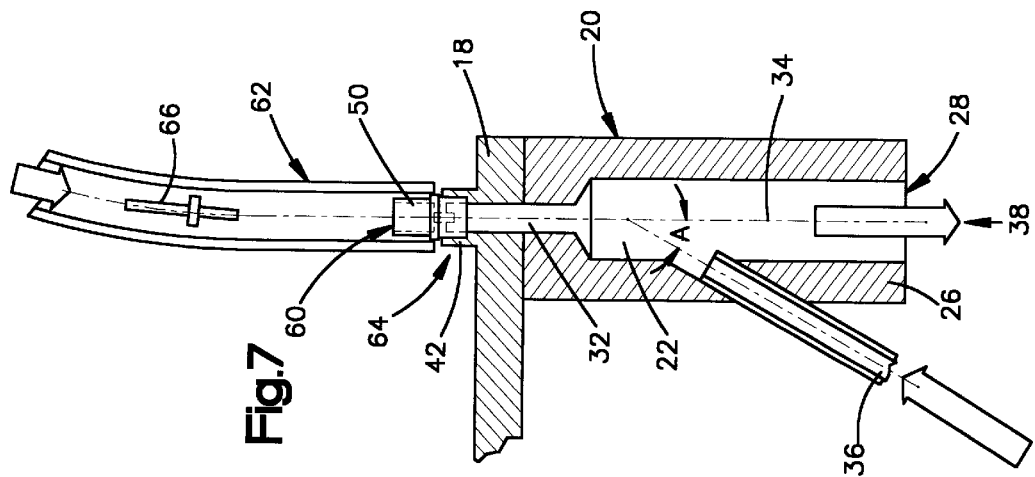
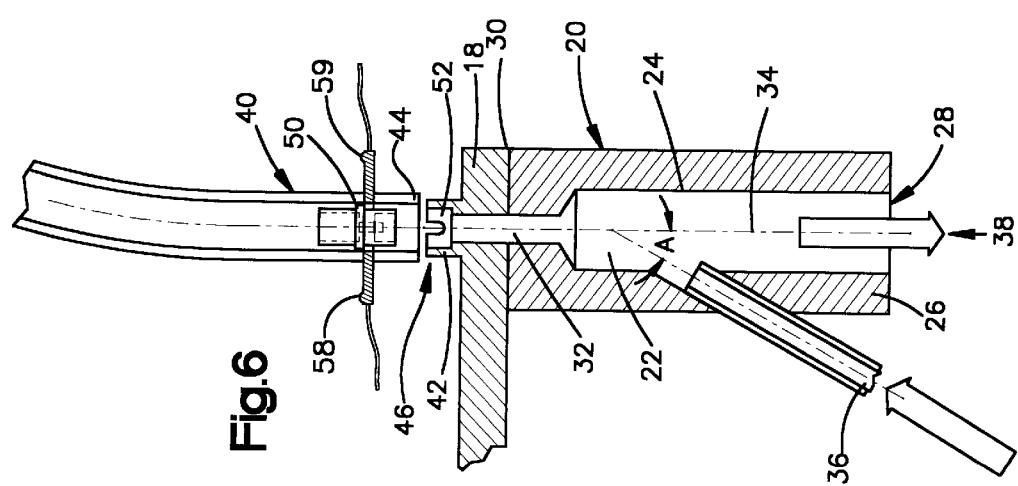

DIFFERENTIAL PRESSURE ASSEMBLY DEVICE FOR MAKING CONNECTOR ASSEMBLIES

FIELD OF THE INVENTION

This invention relates generally to the assembly of components and more particularly to the assembly of one part with a key into a part with a keyway.

BACKGROUND OF THE INVENTION

A variety of applications in numerous industries exist that call for a need to join together components to form connector assemblies. More particularly, various industries require the use of connector assemblies, wherein one component, with a key incorporated into its design, is assembled with another receptacle-like component, having a key receptacle or keyway in its structure. In these connector assemblies, the components are assembled by inserting the keyed component into the keyway of the receptacle component so that the key fits in the keyway. Thus, the keyed component is locked into the receptacle component for further processing or for immediate use as a connector assembly. Often, this assembly of the components is performed by expensive and intricate automated robotic "pick and place systems." Accordingly, a less intricate system is needed.

One such industry having a need for such an assembly system is the fiber optics industry. Fiber optic systems often require connector assemblies in order to join together fiber optic strands. Fiber optic devices require strands of fiber optics having an inner circular glass core coated with a circumferential cladding having a different index of refraction. Light is transmitted along the core and totally reflected from the interface between the core and the cladding. Such fiber optic devices can be used as transmission lines for transmitting information bearing light energy. A transmission line can be formed from a single fiber or it can include a plurality of fibers bundled together as a cable.

When the transmission line is relatively long and extends between different pieces of fiber, the transmission line is divided into segments, and the different segments are connected using separable fiber optic connectors. The principal design criteria of such connectors is to join the transmission lines in an end-to-end relationship in such a manner as minimize loss of light energy. Most fiber optic connectors are designed to place the ends of the transmission lines into as close an axial alignment as possible.

There presently exists various connector assemblies for this axial alignment of fiber optics. Often, components with keyed surfaces are used to form connector assemblies. As stated above the components comprising these connector assemblies are often joined together by automated manufacturing methods. Particularly, robotic methods such as robotic pick and place are used to form the fiber optics connector assemblies. These robotic mechanisms tend to be expensive and difficult to maintain due to their intricate nature.

The difficulty in maintaining these systems arises because they must perform intricate assembling tasks. For instance, to assemble a round, keyed component into a receptacle with a key receiving notch or keyway, a number of complex and intricate sequential procedures are necessary. First, the robotic mechanism must grip the component. Then, the mechanism must sense the orientation of the component. Next, the mechanism must rotate the component in order to align the key of the component with the receptacle's keyway. Finally, the component is inserted into the receptacle while maintaining the alignment of the key with the keyway.

Besides producing connector assemblies for use in fiber optics applications, the present invention can be used in a variety of other fields of endeavor. For instance, the present invention has applications in the manufacture of toys, automobiles, material transport devices or in almost any other field where automated assembly equipment is utilized.

It is, therefore, a primary object of the invention to provide a device and method for assembling components wherein a component with a key is securely disposed within a receptacle component that has a keyway for accepting and holding in place that key. It is another object of the invention to provide such an assembly which is of relatively simple construction and which can be produced in a relatively inexpensive manner.

SUMMARY OF THE INVENTION

In accordance with one aspect of the present invention, the solution to the aforementioned problems is a differential pressure assembly involving transporting a component to a receptacle and activating a positive air flow that nutates the part about the receptacle until properly aligned so that a negative air flow or gravity forces engagement of the aligned part into the receptacle.

In accordance with another aspect of the invention, the air flows are contained within a manifold or similar fixture in which a negative air supply or vacuum is provided axially through a lower portion of the manifold and acts to bring a component with a key thereon into contact with a receptacle having a keyway to securely hold that keyed component in place. Air injected through a positive air pressure port forms a vortex type flow of air that causes the keyed component to rotate or nutate about the receptacle until the key aligns with the keyway and the vacuum draws the component into the receptacle with the key in the keyway to assemble the component with the receptacle.

In accordance with another aspect of the invention, a delivery mechanism is provided to feed the keyed component through a guide tube configured for component transport and into the receptacle having the keyway. The guide tube is in communication with the manifold so that an interface is formed between the guide tube and the manifold. A seat portion for containment of the receptacle can be on either of the manifold or a separate element locatable between the manifold and the guide tube so that an interface is formed to allow the vortex type air flow created by the positive air pressure port to rotate or nutate the component resulting in alignment of the key with the keyway. After alignment, the negative air pressure port exerts a vacuum force on the now aligned component to secure the component to the receptacle.

As defined herein, the present invention provides an apparatus and method for assembling these components into connector assemblies which has a simpler and relatively less expensive construction than current robotic systems. It is believed that this invention constitutes a significant advancement in the art.

BRIEF DESCRIPTION OF THE DRAWINGS

FIG. 3 is a sectional view taken substantially taken along the plane represented by the line 3—3 of FIG. 2;

FIG. 4 is a perspective view of the component and component receiving receptacle of FIG. 2;

FIG. 5 is a longitudinal sectional view of another embodiment of the different pressure apparatus of the invention in which the seat portion is incorporated into the manifold;

FIG. 6 is a longitudinal sectional view of yet another embodiment of the differential pressure apparatus of the invention in which an optical sensor is placed in the manifold-guide tube interface; and FIG. 7 is a longitudinal sectional view of yet another embodiment of the differential pressure apparatus of the invention in which a telescoping component is placed into the connector assembly.

DETAILED DESCRIPTION OF THE INVENTION

Figure 1:
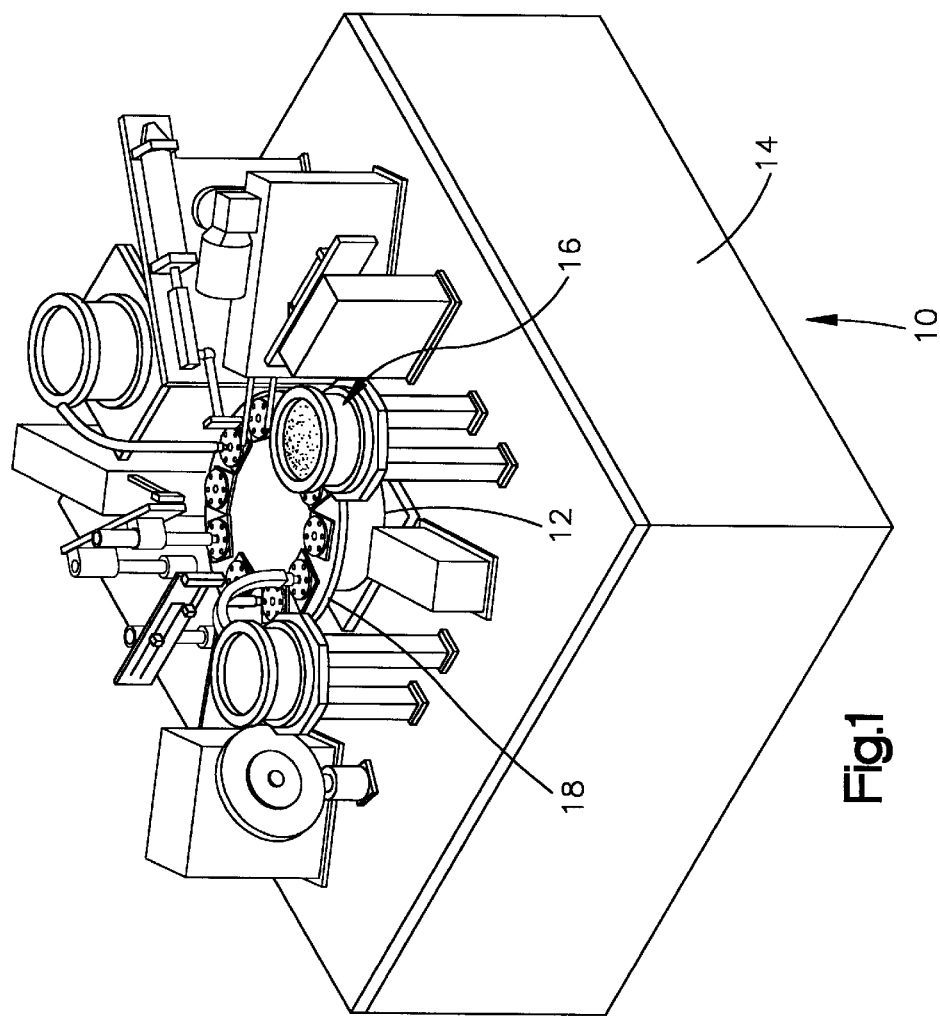
FIG. 1 is a perspective environmental view of the differential pressure apparatus in one possible manufacturing system.

Referring to the drawings and for the present to FIG. 1, an embodiment of the present invention is shown in a component assembly apparatus 10. A plurality of assembly stations 12 are provided, each mounted on a base member 14. A differential pressure assembly device, generally shown at 16, is attached to a rotatable table 18 of the base member 14. The differential pressure assembly device 16 performs the assembly function. Then the connector assembly is indexed and moved to a next station 12 by the rotatable table 18 for further processing. In the fiber optics industry, this processing may include joining together strands of fiber optics to make a transmission line.

Figure 2:
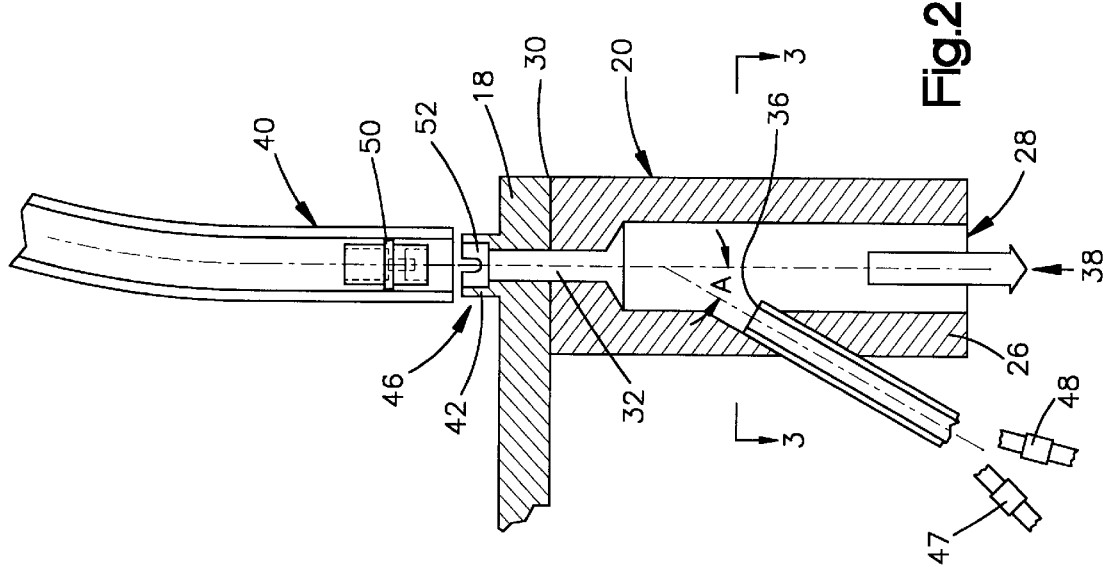
FIG. 2 is longitudinal sectional view of one embodiment of the differential pressure apparatus of FIG. 1.

As can be best seen in FIG. 2, a manifold, designated generally as 20, is provided to have a central chamber 22 defined by a wall surface 24 extending between a lower end 26 having a lower end opening 28 and a top end 30, with a top end opening 32, and having a longitudinal axis 34. A positive air pressure port 36 communicates with the chamber 22 and acts as an air inlet for air introduced under pressure as described presently. The lower end opening 28 acts as a negative air pressure port 38 when connected to a vacuum source which is not shown. This axial orientation of the negative air pressure port 38 is desirable to ensure that optimal vacuum force can be exerted on a keyed component 50 when securing the component 50 in place.

As can be best seen in FIG. 3, the positive air pressure port 36 is oriented at a compound angle relative to the longitudinal axis 34 of the manifold. In other words, the positive air pressure port 36 is oriented eccentrically, or off-centered, relative to the longitudinal axis 34 of the manifold 20. Referring to FIG. 2, the positive air pressure port 36 is also oriented so that an axis 37 of the positive air pressure port 36 intersects the longitudinal axis to form an acute angle A, substantially as shown. This eccentric and acute orientation of the positive air port 36 is for the surface of the chamber to form a vortex-type flow of air within and upwardly through central chamber 22 of the manifold 20, as indicated by the arrows in FIGS. 2 and 3.

Turning to FIG. 4, a schematic view of the component 50 which is to be assembled with a component receiving receptacle 52 is shown. The component 50 has a key 54 which inserts into a keyway 56 of component receiving receptacle 52. While FIG. 3 shows the component 50 having a generally cylindrical configuration with the key 54 attached, it is contemplated that the present invention can accommodate other geometrical configurations as long as the contemplated configuration has an asymmetrical portion. Thus, the term key includes any asymmetrical configuration which can be oriented in a given orientation.

Turning back to FIG. 2, engagement of a guide tube 40 with the manifold 20 while deploying a keyed component 50 at one assembly station 12 is illustrated. The rotatable table 18 has a plurality of receptacle receiving seats 42 into which the component receiving receptacle 52 is inserted and the rotatable table 18 is moved to position the component receiving receptacle 52 between the manifold 20 and a guide tube 40. The guide tube 40 is hollow and configured so that the keyed component 50 may be transported to the component receiving receptacle 52. As shown in FIG. 2, the seat 42 engages the top end 30 of the manifold 20 and bottom surface 44 of the guide tube 40. The seat 42 contains the component receiving receptacle 52 and when the manifold 20 and guide tube 40 engage the seat 42, an interface, shown generally, at 46, is formed. The operation of the assembly orients the component such that the key 54 aligns with the keyway 56 allowing the component 50 to be inserted into the receptacle 52 to form the connector assembly.

This embodiment is preferred because it allows both the manifold 20 and the guide tube 40 to engage the seat 42, form the connector assembly and then be withdrawn so that further processing can be performed on the connector assembly, after it is formed. In another embodiment, the seat 42 could be incorporated into the design of the manifold 20. This such embodiment can be best seen in FIG. 5.

To form a connector assembly, the positive air pressure port 36 must be activated by applying positive air pressure at the positive air pressure port 36 through an air pressure regulator. The positive air pressure port 36 extends from the side surface of the manifold 20 to form an angle A that is acute with respect to the longitudinal axis 34 and such that the axis 37 of the port 36 is angled upwardly toward the top end opening 32. Also, the positive air pressure port 36 is positioned eccentrically or off-center relative to the longitudinal axis 34. With this configuration, the air flowing from this port creates a vortex or cyclonic air movement upwards towards the seat 42.

Once the positive air supply is activated to form the vortex, the guide tube-manifold interface 46 is established at one of the locations described earlier, and a conventional escape or release mechanism, is not shown, is activated to send the keyed component 50 into the guide tube 40. A variety of conventional and well-known means may be used to feed the keyed component into the guide tube 40. As described with respect to FIG. 3, a vacuum is created at the negative air pressure port 38 by a vacuum source, not shown, to bring the component 50 down the guide tube 40. However, it is possible in some cases to allow the component 50 to travel down the guide tube 40 under the force of gravity alone.

The vortex causes the keyed component 50 to spin with this spin being imbalanced. This imbalanced spin, or nutation, is caused by the non-symmetrical geometry of the keyed component 50 being acted on by the vortex or cyclonic action of the air. The key 54 induces the nutation as the air flows past it, and the air flow of the vortex counteracts the weight of the component 50. Accordingly, this positive air volume of flow can be varied to counteract the different weights of varying types of components. Also, the air pressure should be variable in order to actually levitate the nutating component 50 and thereby allow it to "float" down into the component receiving receptacle 52. Thus, the air pressure regulator 47 is used to regulate air pressure in the positive air pressure port 36 while a positive air pressure port flow controller 48 is required to monitor the volume of air flow of this positive air pressure port 36.

The keyed component 50 eventually comes to rest along a top rim of the receptacle 52 where it slowly nutates until the key 54 of the component 50 aligns with the keyway 56 of the receptacle 52. To determine if the key is aligned with the keyway, an optical sensor comprising an optical transmitter 58 and an optical receiver 59 insertable adjacent the interface 46, as shown in FIG. 6, or the guide tube 40 may be made of a translucent material to provide visual inspection.

Once the key 54 is aligned with the keyway 56, the negative air pressure port 38 is activated. The force of the vacuum pulls the key 50 into the keyway 56 and the component 50 and receptacle 52 form a connector assembly. To control the flow of the vacuum, a negative air pressure port flow controller, not shown, is required.

The differential pressure assembly device and method can be incorporated into many well-known manufacturing methods. One such manufacturing set-up is illustrated in FIG. 1. The manifold 20 is incorporated into a rotatable work table 18 having other processing stations included in the design. In such an embodiment, the connector assembly is formed and then can be moved on to another work station on the table 18 for further processing. As best seen in FIG. 1, a multiplicity of movable guide tubes 40 can be incorporated into this design for use in producing telescoping connector assemblies. Also, the movable guide tube system could be used without a rotatable table system or with other conventional systems such as conveyors.

As best shown in FIG. 7, the movable guide tube system can be used to join another component with the connector assembly. In this embodiment, the keyed component 50 is designed to have its own component receiving receptacle 60. Once the keyed component is properly placed into the receptacle contained within the seat 42, the first guide tube 40 is disengaged from the interface, and a second guide tube 62 is engaged to form another interface 64. The pressure ports 36, 38 of the manifold 20 are then activated as described above to join this second component 66 with the keyed component 50. Thus, a telescoping connector assembly can be formed in this manner.

While there have been shown and described what are at present considered the preferred embodiments of the invention, it will be obvious to one skilled in the art that various changes and modifications may be made therein without departing from the scope of the invention as defined by the claims.

We claim:

1. An apparatus for orienting and retaining a component in a given orientation wherein the component has a keyed surface thereon and is insertable within a receptacle having a keyway for engaging said keyed surface comprising:

a manifold member defining a central chamber extending from a first end to an open second end and having a longitudinal axis and a positive air pressure inlet port communicating with said chamber and being acutely angled and eccentrically positioned with respect to the longitudinal axis;

a removable guide tube having a central cavity configured to receive the component and having one end thereof configured to interface with the second end of said central chamber of said manifold;

a receptacle receiving seat locatable between said second end of said manifold and said guide tube to form a guide tube-manifold interface; and an air pressure regulator in communication with said inlet port.

2. The invention as defined in claim 1 wherein said receptacle receiving seat is carried by a support member selectively locatable between said manifold and said guide tube.

3. The invention as defined in claim 2 wherein said support member is a rotatable turntable.

4. The invention as defined in claim 1 wherein a vacuum device is selectably connected to said first end of said chamber.

5. The invention as defined in claim 1 further comprising an air flow regulating device in communication with said positive air pressure inlet port.

6. The invention as defined in claim 1 wherein said guide tube is configured to accept components having a generally cylindrical configuration.

7. The invention as defined in claim 1 wherein said central chamber has a lower section with a generally cylindrical configuration and an upper section with a generally conical configuration.

8. An apparatus for orienting and retaining a component in a given orientation wherein the component has a keyed surface thereon and is insertable within a receptacle having a keyway for engaging said keyed surface comprising:

a manifold member having an external surface defining a central chamber extending from an open top end to a lower end and having a longitudinal axis;

a receptacle retaining seat having a top surface and a bottom surface;

said top end of said manifold being engagable with said bottom surface of said receptacle retaining seat;

an air inlet port angled acutely and positioned eccentrically relative to the longitudinal axis and extending to said receptacle retaining seat;

a guide tube removably engagable with said top surface of said receptacle receiving seat and having a central cavity configured to receive the component;

an air pressure regulator in communication with said inlet port;

an air flow regulator in communication with said inlet port.

9. The invention as defined by claim 8 wherein said receptacle receiving seat is carried by a support member selectively locatable between said manifold and said guide tube.

10. The invention of claim 9 wherein said support member is a rotatable turntable.

11. The invention as defined in claim 8 wherein a vacuum device is selectably connected to said lower end of said chamber.

12. The invention as defined in claim 8 wherein said guide tube is configured to accept components having a generally cylindrical configuration.

13. The invention as defined in claim 8 wherein said central chamber has a lower section with a generally cylindrical configuration and an upper section with a generally conical configuration.

* * * * *